United States Patent
Dam et al.

(10) Patent No.: US 12,498,732 B2
(45) Date of Patent: Dec. 16, 2025

(54) SYSTEMS AND METHODS FOR CHARACTERIZING A VEHICLE MOTION OF AN AUTONOMOUS MOBILE ROBOT

(71) Applicant: CLEARPATH ROBOTICS INC., Kitchener (CA)

(72) Inventors: Robert Dam, Waterloo (CA); Alex Jou, Kitchener (CA); Amer Keblawi, Kitchener (CA); Ryan Christopher Gariepy, Kitchener (CA); Jason Mercer, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 154 days.

(21) Appl. No.: 18/415,338

(22) Filed: Jan. 17, 2024

(65) Prior Publication Data
US 2025/0231560 A1    Jul. 17, 2025

(51) Int. Cl.
G05D 1/22    (2024.01)
G05D 111/50    (2024.01)

(52) U.S. Cl.
CPC .......... G05D 1/22 (2024.01); G05D 2111/52 (2024.01); G05D 2111/54 (2024.01)

(58) Field of Classification Search
CPC ... G05D 1/22; G05D 2111/52; G05D 2111/54
See application file for complete search history.

(56) References Cited

U.S. PATENT DOCUMENTS

| | | | |
|---|---|---|---|
| 5,581,250 A | 12/1996 | Khvilivitzky | |
| 5,700,074 A | 12/1997 | Sugimoto et al. | |
| 5,785,281 A | 7/1998 | Peter et al. | |
| 5,806,938 A | 9/1998 | Stumpe et al. | |
| 5,983,161 A | 11/1999 | Lemelson et al. | |
| 6,405,132 B1 | 6/2002 | Breed et al. | |

(Continued)

FOREIGN PATENT DOCUMENTS

WO    2015008380 A1    1/2015

OTHER PUBLICATIONS

Xiao et al., Pallet recognition and localization using an RGB-D camera, Sep. 13, 2017, International Journal of Advanced Robotic Systems, (Year: 2017).

*Primary Examiner* — Aaron L Troost

(57) ABSTRACT

A method and system are provided for characterizing a vehicle motion of an autonomous mobile robot in response to a triggering event. The method and system involve an autonomous mobile robot and a vehicle processor operable to navigate the autonomous mobile robot. The system further includes a motion characterization system coupled to the autonomous mobile robot, the motion characterization system comprising an odometry system operable to collect vehicle motion data associated with the vehicle motion; a triggering component; a storage component for storing an event start time, an event end time and the vehicle motion data between the event start time and the event end time; and a motion characterization processor operable to: receive an initialization input to initiate the triggering event; generate a trigger signal to cause the triggering component to cause the triggering event; and identify the event start time and an event end time.

18 Claims, 7 Drawing Sheets

(56) References Cited

U.S. PATENT DOCUMENTS

| | | |
|---|---|---|
| 9,102,406 B2 | 8/2015 | Stark et al. |
| 9,141,109 B1 | 9/2015 | Kamata |
| 9,187,088 B1 | 11/2015 | Ferguson et al. |
| 9,383,753 B1 | 7/2016 | Templeton et al. |
| 9,442,487 B1 | 9/2016 | Ferguson et al. |
| 9,671,791 B1 | 6/2017 | Paczan |
| 9,779,314 B1 | 10/2017 | Wendel et al. |
| 9,896,030 B2 | 2/2018 | Sugimoto |
| 10,019,008 B2 | 7/2018 | Kong et al. |
| 10,328,942 B2 | 6/2019 | Kelly et al. |
| 10,446,034 B2 | 10/2019 | Akamine et al. |
| 10,909,629 B1 | 2/2021 | Madigan et al. |
| 11,225,275 B2 | 1/2022 | Gariepy et al. |
| 11,305,593 B2 | 4/2022 | Coombs |
| 11,649,147 B2 | 5/2023 | Lunscher et al. |
| 2002/0013651 A1 | 1/2002 | Weiberle et al. |
| 2002/0137489 A1 | 9/2002 | Dutta et al. |
| 2003/0096594 A1 | 5/2003 | Naboulsi |
| 2004/0204803 A1 | 10/2004 | Matsuda et al. |
| 2005/0023052 A1 | 2/2005 | Beck et al. |
| 2007/0106473 A1 | 5/2007 | Bodin et al. |
| 2008/0018472 A1 | 1/2008 | Dasilva et al. |
| 2008/0106886 A1 | 5/2008 | Sugimoto et al. |
| 2009/0210109 A1 | 8/2009 | Ravenscroft |
| 2009/0222134 A1 | 9/2009 | Franke et al. |
| 2011/0015844 A1 | 1/2011 | Perkins et al. |
| 2011/0021310 A1 | 1/2011 | Kresse et al. |
| 2011/0210529 A1 | 9/2011 | Markstaller |
| 2012/0310466 A1 | 12/2012 | Fairfield et al. |
| 2013/0142393 A1 | 6/2013 | Burger et al. |
| 2013/0144480 A1 | 6/2013 | Kobayashi et al. |
| 2013/0197760 A1 | 8/2013 | Castaneda et al. |
| 2013/0253770 A1 | 9/2013 | Nishikawa et al. |
| 2013/0311075 A1 | 11/2013 | Tran et al. |
| 2014/0114526 A1* | 4/2014 | Erb .................. B66F 9/063 701/28 |
| 2014/0214255 A1 | 7/2014 | Dolgov et al. |
| 2014/0277888 A1 | 9/2014 | Dastoor et al. |
| 2014/0365113 A1 | 12/2014 | Mcgavran et al. |
| 2015/0046034 A1 | 2/2015 | Kikuchi |
| 2015/0161872 A1 | 6/2015 | Beaulieu et al. |
| 2015/0239442 A1 | 8/2015 | Yamakado et al. |
| 2015/0251658 A1 | 9/2015 | Kato |
| 2015/0266487 A1 | 9/2015 | Kato |
| 2015/0269860 A1 | 9/2015 | Shaw et al. |
| 2015/0291210 A1 | 10/2015 | Kageyama |
| 2016/0001775 A1 | 1/2016 | Wilhelm et al. |
| 2016/0059851 A1 | 3/2016 | Klier et al. |
| 2016/0068267 A1 | 3/2016 | Liu et al. |
| 2016/0093210 A1 | 3/2016 | Bonhomme |
| 2016/0193999 A1 | 7/2016 | Sasabuchi |
| 2016/0250930 A1 | 9/2016 | Collins et al. |
| 2016/0304198 A1 | 10/2016 | Jourdan |
| 2016/0318445 A1 | 11/2016 | Sugimoto |
| 2017/0036771 A1 | 2/2017 | Woodman et al. |
| 2017/0076616 A1 | 3/2017 | Kanade et al. |
| 2017/0102241 A1 | 4/2017 | Paduano et al. |
| 2017/0158178 A1 | 6/2017 | Kerber et al. |
| 2017/0188510 A1 | 7/2017 | Einecke et al. |
| 2017/0253241 A1 | 9/2017 | Filev et al. |
| 2017/0355360 A1 | 12/2017 | Reed et al. |
| 2018/0012490 A1 | 1/2018 | Jodorkovsky et al. |
| 2018/0162349 A1 | 6/2018 | Chang et al. |
| 2018/0211536 A1 | 7/2018 | Akamine et al. |
| 2018/0264950 A1 | 9/2018 | Yokoyama et al. |
| 2018/0297585 A1 | 10/2018 | Lian et al. |
| 2018/0339701 A1 | 11/2018 | Kwon |
| 2019/0079537 A1 | 3/2019 | Yoshida et al. |
| 2019/0092347 A1 | 3/2019 | Kim |
| 2019/0120951 A1 | 4/2019 | Fischer |
| 2019/0202465 A1 | 7/2019 | Kato et al. |
| 2019/0294167 A1 | 9/2019 | Kutila et al. |
| 2019/0344796 A1 | 11/2019 | Lian et al. |
| 2020/0239242 A1 | 7/2020 | Hoofard et al. |
| 2020/0284601 A1 | 9/2020 | Myers et al. |
| 2021/0232153 A1 | 7/2021 | Inoue |
| 2022/0005291 A1 | 1/2022 | Konrardy et al. |
| 2022/0258614 A1 | 8/2022 | Matsuki et al. |
| 2025/0180422 A1* | 6/2025 | Rauhala .............. G01M 17/007 |

\* cited by examiner

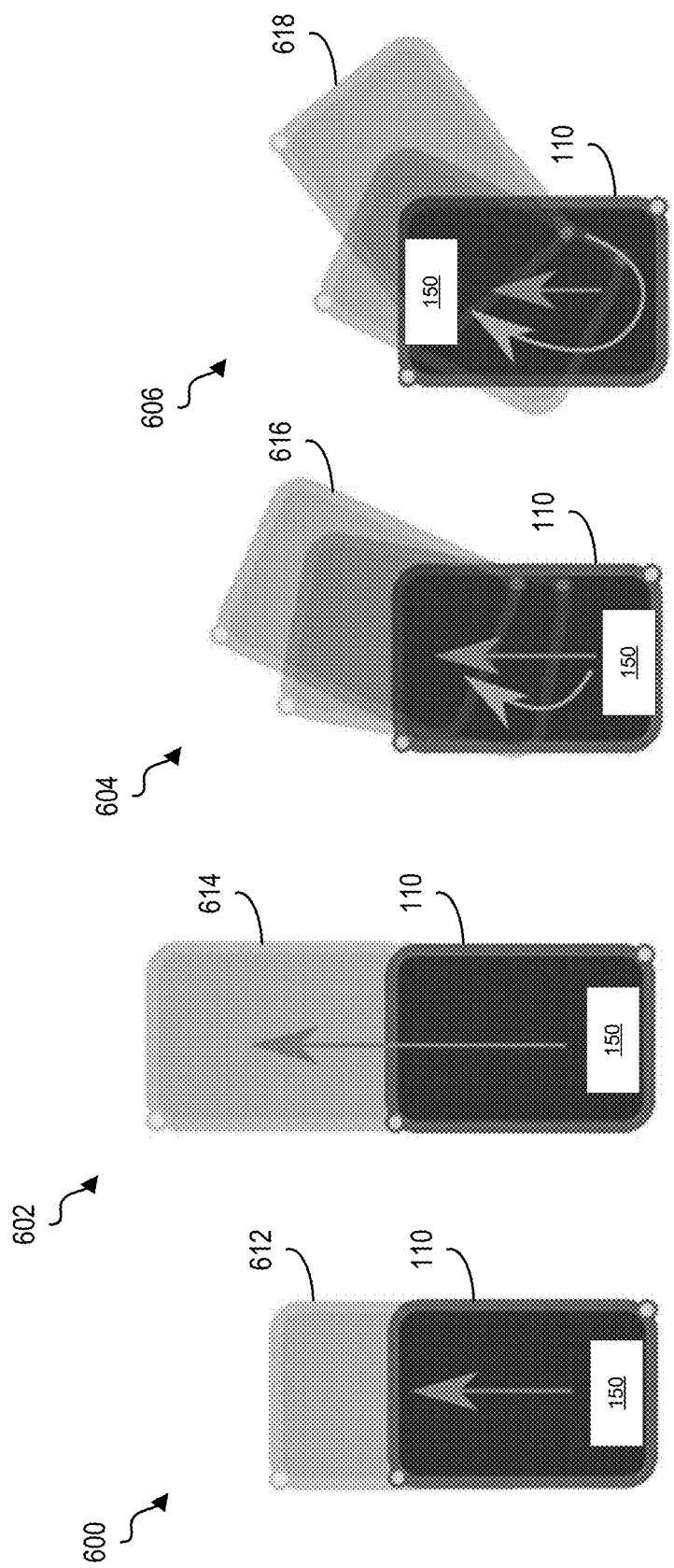

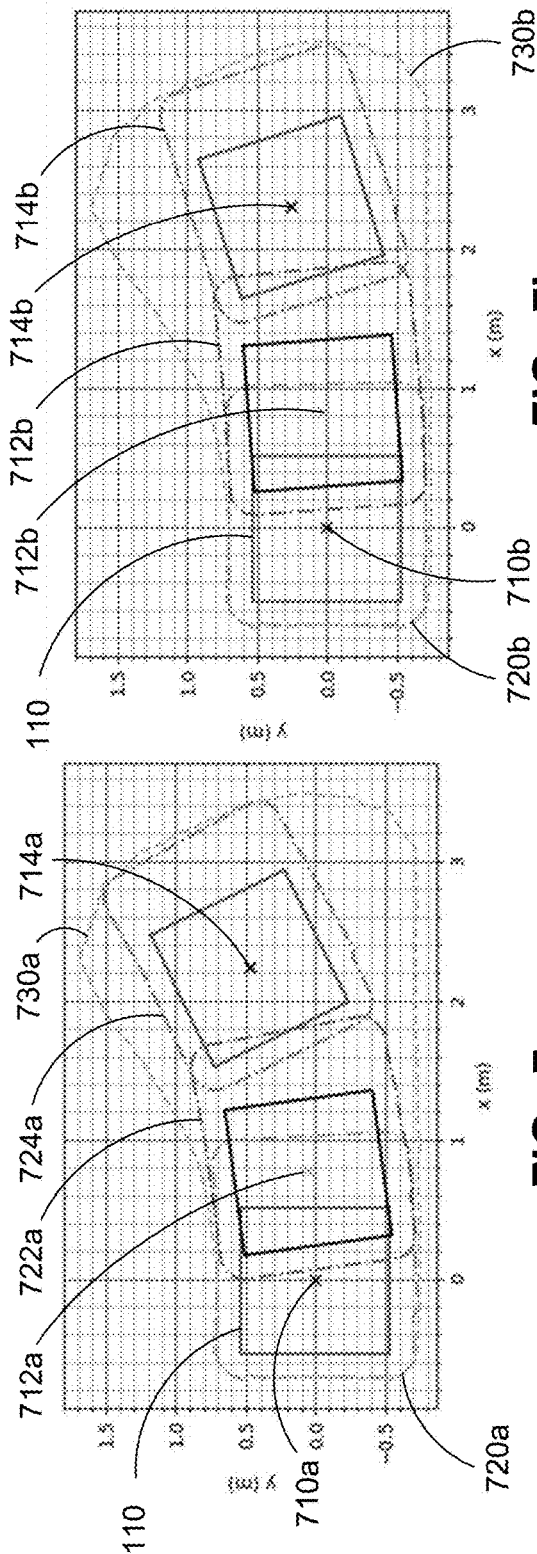
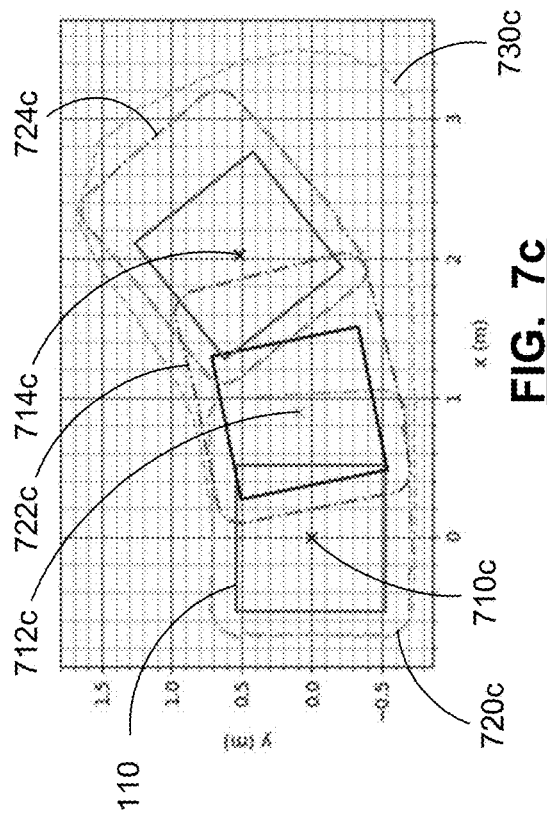
FIG. 7a
FIG. 7b
FIG. 7c

SYSTEMS AND METHODS FOR CHARACTERIZING A VEHICLE MOTION OF AN AUTONOMOUS MOBILE ROBOT

FIELD

The described embodiments relate to systems and methods for characterizing a vehicle motion of an autonomous mobile robot, in particular, in response to a triggering event.

BACKGROUND

Autonomous mobile robots are becoming commonplace in industrial environments. Advances in robotic technology have made it possible for robots to move with increasingly greater speed, leading to faster transportation of goods and higher efficiency of production. With the advances in movement capability, safety considerations become even more important in autonomous mobile robot operation. Data about the motion characteristics of an autonomous mobile robot under different operational conditions, such as braking conditions, can be used to optimize the movement of an autonomous mobile robot while ensuring continued safe operation. Such data may help inform, for example, safe braking distances or turning radii at certain speeds for a given vehicle, allowing the autonomous mobile robot to operate efficiently at high speeds while ensuring safety standards are satisfied.

Capturing and properly interpreting this data can be difficult. Existing solutions can be slow, not portable, inaccurate, or prohibitively expensive. Further, existing testing solutions may require manual resetting with each trial. A human may be required to position, remove, or reposition an obstacle each time a testing trial is run. In addition, indeterminate latencies in data transmission between parts in the system may affect the quality of the results, and the effects thereof are magnified with increased operating speeds.

SUMMARY

The various embodiments described herein generally relate to systems (and associated methods for operating the systems) for characterizing a vehicle motion of an autonomous mobile robot in response to a triggering event. The system comprises the autonomous mobile robot, the autonomous mobile robot comprising a vehicle sensor and a vehicle processor. The vehicle sensor is operable to detect the triggering event and generate an operational signal in response to detecting the triggering event and the vehicle processor is operable to navigate the autonomous mobile robot in response to one or more of: a navigation command and the operational signal. The system further includes a motion characterization system coupled to the autonomous mobile robot, the motion characterization system comprising an odometry system operable to collect vehicle motion data associated with the vehicle motion; a triggering component coupled with respect to the vehicle sensor, and operable to cause the triggering event; a storage component for storing an event start time, an event end time and the vehicle motion data between the event start time and the event end time; and a motion characterization processor operable to: receive an initialization input to initiate the triggering event; generate a trigger signal to cause a triggering component to cause the triggering event; and identify the event start time as a time when the triggering signal is sent to the triggering component, and the event end time as a time when the autonomous mobile robot completes a response to the triggering event.

In some embodiments, the motion characterization processor may be operable to: receive a reset input; and cause the triggering event to reset upon receiving the reset input.

In some embodiments, the motion characterization processor may be further operable to monitor at least one motion parameter associated with the autonomous mobile robot and wherein the at least one monitored motion parameter is within a tolerance range before the characterization processor generates the triggering signal.

In some embodiments, the motion characterization processor may be further operable to determine that the autonomous mobile robot is no longer in motion and in response to determining that the autonomous mobile robot is no longer in motion, determine that the autonomous mobile robot completed the response to the triggering event.

In some embodiments, the motion characterization processor may be further operable to continuously record the vehicle motion data from a predefined start time to a predefined end time.

In some embodiments, the odometry system may be operationally independent from a vehicle odometry system of the autonomous mobile robot.

In accordance with another aspect, there is generally disclosed herein methods for characterizing a vehicle motion of an autonomous mobile robot in response to a triggering event. The method comprises operating a motion characterization system coupled to the autonomous mobile robot to: receive an initialization input to initiate the triggering event; generate a trigger signal to cause a triggering component to cause the triggering event; operate the triggering component to cause the triggering event; receive an operational signal from a vehicle processor in response to a vehicle sensor detecting the triggering event; identify an event start time as a time when the triggering signal is sent to the triggering component, and an event end time as a time when the autonomous mobile robot completes a response to the triggering event; and store vehicle motion data associated with the vehicle motion at least during operation of the autonomous mobile robot between the event start time and the event end time.

In some embodiments, the motion characterization system may receive a reset input and cause the triggering event to reset upon receiving the reset input.

In some embodiments, the motion characterization system may monitor at least one motion parameter associated with the vehicle and determine that the motion parameter is within a tolerance range before causing the triggering event.

In some embodiments, the motion characterization system may: determine that the vehicle is no longer in motion; and in response to determining that the vehicle is no longer in motion, determine that the vehicle completed a response to the triggering event.

In some embodiments, the motion characterization system may record the vehicle motion data continuously from a predefined start time to a predefined end time.

In some embodiments, the motion characterization system may send an indication to an external component at the time that the triggering signal is generated.

In accordance with another aspect, there is generally disclosed a motion characterization system for an autonomous mobile robot. The motion characterization system comprises: an odometry system operable to collect vehicle motion data associated with a motion of the autonomous mobile robot; a triggering component coupled with respect to a vehicle sensor of the autonomous mobile robot, and operable to cause a triggering event; a storage component for storing an event start time, an event end time and vehicle motion data between the event start time and the event end time; and a motion characterization processor operable to: receive an initialization input to initiate the triggering event; generate a triggering signal to cause the triggering component to cause the triggering event; and identify the event start time as a time when the triggering signal is sent to the triggering component, and the event end time as a time when the autonomous mobile robot completes a response to the triggering event.

In some embodiments, the motion characterization processor may: receive a reset input; and cause the triggering event to reset upon receiving the reset input.

In some embodiments, the motion characterization processor may monitor at least one motion parameter associated with the autonomous mobile robot, and wherein the at least one motion parameter is within a tolerance range before the motion characterization processor generates the triggering signal.

In some embodiments, the motion characterization processor may determine that the autonomous mobile robot is no longer in motion and in response to determining that the autonomous mobile robot is no longer in motion, determine that the autonomous mobile robot completed the response to the triggering event.

In some embodiments, the motion characterization processor may continuously record the vehicle motion data from a predefined start time to a predefined end time.

In some embodiments, the odometry system may be operationally independent from a vehicle odometry system of the autonomous mobile robot.

BRIEF DESCRIPTION OF THE DRAWINGS

Several embodiments will now be described in detail with reference to the drawings, in which:

FIGS. 6a to 6d are illustrations of example motions of an autonomous mobile robot; and FIGS. 7a to 7c are graphical illustrations of motion data captured by the motion characterization system in accordance with example embodiments.

Figure 1:
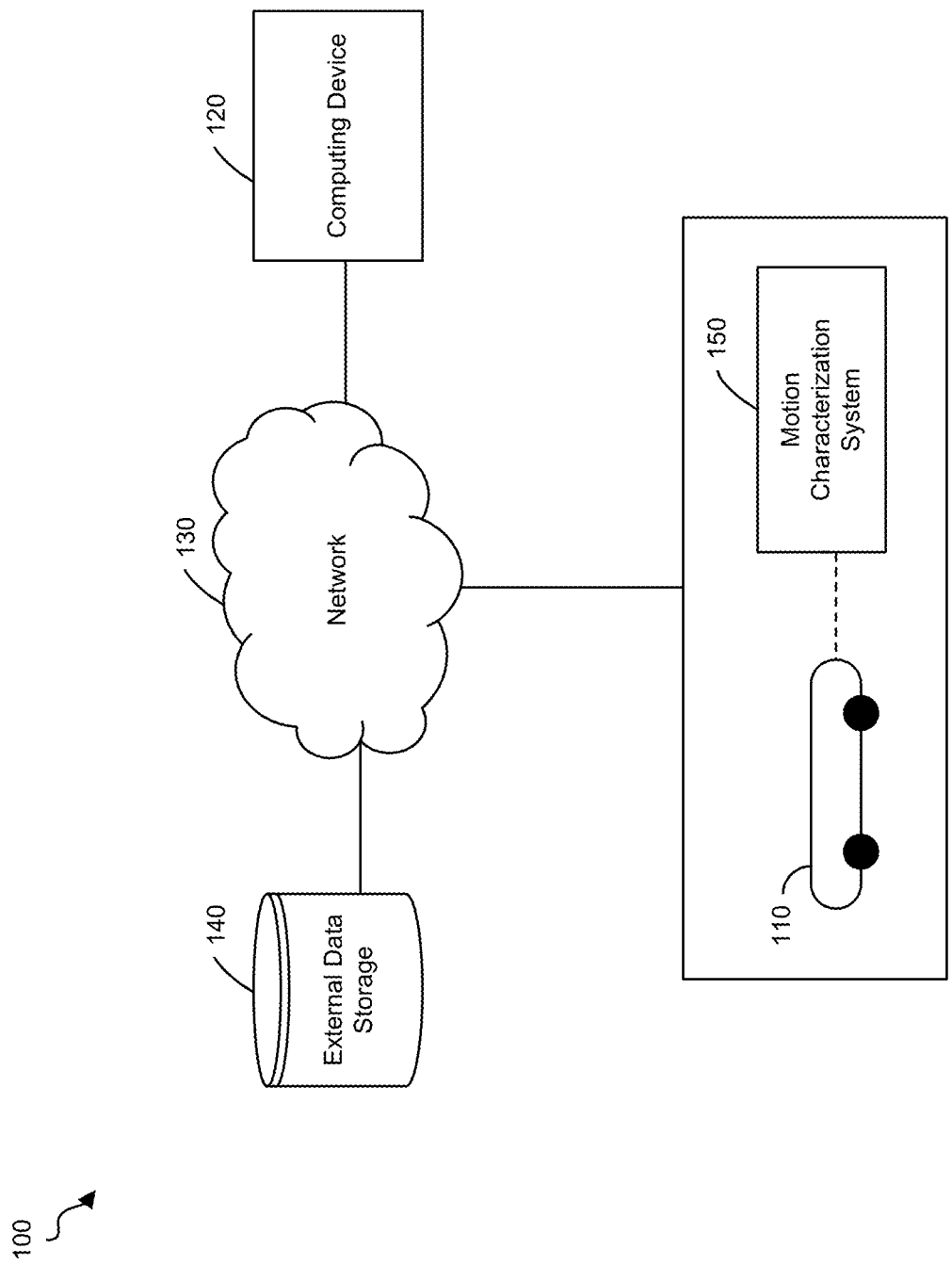
FIG. 1 is a block diagram of components interacting with a motion characterization system and an autonomous mobile robot in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) for collecting data related to the motion of an autonomous mobile robot in response to various external conditions.

The collection of this data is important to safe operation of autonomous mobile robots. Autonomous mobile robots generally use external sensors to interact with the outside world. These sensors ensure that the autonomous mobile robot is brought to a stop if the autonomous mobile robot gets too close to any other object(s). For example, the sensors may define a safety boundary, which may be referred to as a field shape. An autonomous mobile robot may be configured with a pre-defined set of safety boundaries (or a field set). If an object comes within one of the safety areas defined by a safety boundary within a field set, the autonomous mobile robot may come to a stop to minimize the potential of a collision event. In order to maximize safety, the size of the monitored area needs to be large enough to contain all possible safety-stopping motion profiles of the autonomous mobile robot. For example, if the safety fields are insufficiently sized, safety criteria may not be satisfied. On the other hand, if the safety fields are too big, the motion of the autonomous mobile robot may be hindered as it navigates through aisles or around obstacles. Optimizing the size of the field shape may facilitate the maximization of safety while minimizing hinderances to vehicle performance. Motion data associated with the autonomous mobile robot is important for assisting with optimizing the field shapes. Field shapes may be calculated using the captured data. The resulting shapes may be validated through additional testing.

In order to capture motion data, a system for tracking an object's movements in space may be used. Existing systems for tracking an object's movements in space are not optimized for this purpose. For example, global navigation satellite system based inertial measurement unit (GNSS IMU) tracking does not work indoors. Simultaneous localization and mapping (SLAM) using the vehicle's onboard sensors can be inaccurate. Ultra wide-band (UWB) mapping is costly, not portable, and imprecise. Visual-based tracking systems are costly, not portable, and do not cover sufficient area. Existing systems also typically provide frequent outlier data points that have to be manually analyzed by humans, thereby wasting resources and reducing efficiency.

In order to produce a comprehensive field set, a large sample of data may preferably be collected for each given autonomous mobile robot configuration. Thus, the system should preferably be capable of collecting a large volume of data efficiently.

The system may preferably be capable of testing the entirety of the vehicle safety system, as latency may introduce increasingly significant errors as speeds increase. Additionally, the ability to automatically reset the safety system may lead to time savings and greater efficiency in data collection.

Additionally, a field shape generation toolchain may be used to overlay captured additional vehicle geometries and safety buffers onto each calculated trajectory in order to generate field shapes that adequately incorporates all of the tested data. The field shape generation toolchain is preferably configured to optimize the field shape so that vehicle performance is maximized. The field shape generation toolchain preferably includes the capability to validate all of the test data.

Reference is first made to FIG. 1, which illustrates a block diagram 100 of an example system the disclosed invention may operate in. A computing device 120, an external data storage 140, an autonomous mobile robot 110, and a motion characterization system 150 is shown connected to a network 130. The computing device 120, external data storage 130, autonomous mobile robot 110 and motion characterization system 150 may communicate with each other through the network 130.

The computing device 120 can include a processor, a data storage, and a communication component (not shown). For example, the computing device 120 can be any computing device, such as, but not limited to, an electronic tablet device, a personal computer, workstation, server, portable computer, mobile device, personal digital assistant, laptop, smart phone, WAP phone, an interactive television, video display terminals, gaming consoles, and portable electronic devices or any combination of these. The components of the computing device 120 can be provided over a wide geographic area and connected via the network 130.

The computing device 120 may be in communication with the motion characterization system 150 and the autonomous mobile robot 110. The computing device 120 may issue commands to the motion characterization system 150 and the autonomous mobile robot 110. For example, the computing device 120 may issue navigation commands to the autonomous mobile robot 110. As another example, the computing device 120 may command the motion characterization system 150 to perform certain functions for the purposes of conducting a test.

The processor of the computing device 120 can include any suitable processors, controllers or digital signal processors that can provide sufficient processing power depending on the configuration, purposes and requirements of the computing device 120. In some embodiments, the processor can include more than one processor with each processor being configured to perform different dedicated tasks.

The data storage of the computing device 120 can include random access memory (RAM), a read-only memory (ROM), an erasable programmable read-only memory (EPROM, EEPROM, or Flash memory), one or more hard drives, one or more flash drives or some other suitable data storage elements such as disk drives, etc. The communication component of the computing device 120 can include any interface that enables the computing device 120 to communicate with other devices and systems. In some embodiments, the communication component can include at least one of a serial port, a parallel port or a USB port. The communication component may also include at least one of an Internet, Local Area Network (LAN), Ethernet, Firewire, modem or digital subscriber line connection. Various combinations of these elements may be incorporated within the communication component. For example, the communication component may receive input from various input devices, such as a mouse, a keyboard, a touch screen, a thumbwheel, a track-pad, a track-ball, a card-reader, voice recognition software and the like depending on the requirements and implementation of the computing device 120.

The external data storage 140 can store data related to the autonomous mobile robot 110 and/or the computing device 120. The external data storage 140 can include RAM, ROM, one or more hard drives, one or more flash drives or some other suitable data storage elements such as disk drives, etc.

The network 130 may be any network capable of carrying data, including the Internet, Ethernet, old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the autonomous mobile robot 110, the computing device 120 and/or the external data storage 140. In some embodiments, the autonomous mobile robot 110 can communicate with other robots via the network 130. In some embodiments, the autonomous mobile robot 110 can communicate with other robots directly via onboard communication components.

The autonomous mobile robot 110 may be any autonomous mobile robot. In some embodiments, the autonomous mobile robot 110 is used in an industrial environment for the transportation of goods or persons. The autonomous mobile robot 110 may be the example autonomous mobile robot 210 described in FIG. 2.

The motion characterization system 150 may be coupled with the autonomous mobile robot 110 in order to collect vehicle motion data related to the autonomous mobile robot 110.

Figure 2:
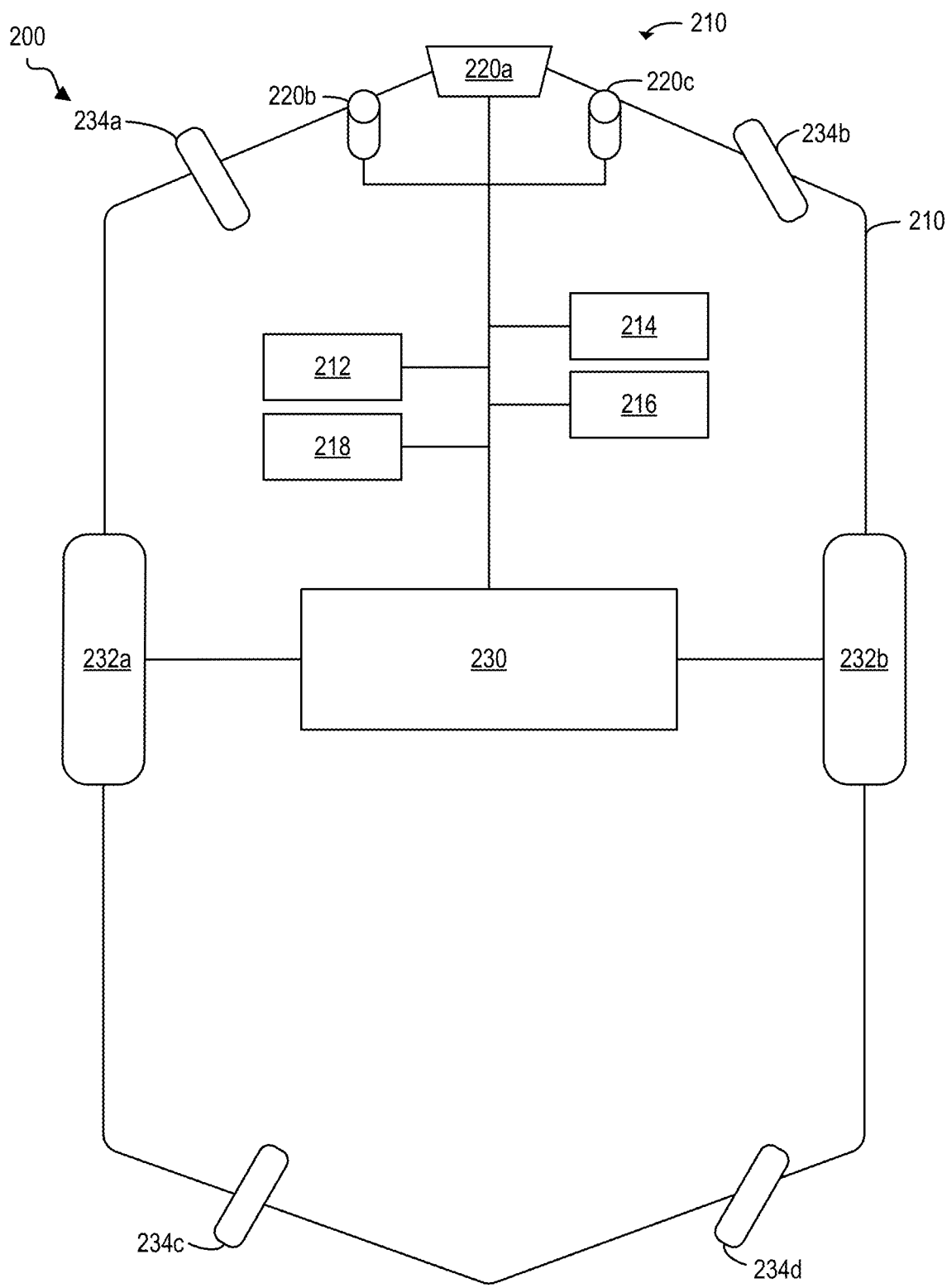
FIG. 2 is a block diagram of example components of an example autonomous mobile robot.

Reference is next made to FIG. 2, which illustrates a schematic diagram 200 showing an example embodiment of an autonomous mobile robot 210. Specifically, autonomous mobile robot 210 can act as an autonomous robot for transporting objects between different locations. The autonomous mobile robot 210 can include a cargo component for carrying loads. For example, the cargo component can be a flatbed or a bucket having sidewalls to prevent loads from falling out as the autonomous mobile robot 210 moves. The autonomous mobile robot 210 can include cargo securing mechanisms to secure the load and prevent the load from falling off the autonomous mobile robot 210. The autonomous mobile robot 210 can include flexible components, which may be removed from the autonomous mobile robot 210. For example, a cargo securing mechanism may be removable when not in use. Although the autonomous mobile robot 210 can act as a transport robot, the autonomous mobile robot 210 is not limited to transporting objects.

The autonomous mobile robot 210 can include a vehicle processor 212, a vehicle data storage 214, a communication component 216, a safety processor 218, a sensing system 220, and a drive system 230. In some embodiments, one or more of the components 212, 214, 216, 218, 220, and 230 can be combined into fewer components, or separated into further components. For example, the vehicle processor 212 and the safety processor 218 can be combined in the same component. In some embodiments, parts of a component can be combined with another part of another component.

The vehicle processor 212 and the safety processor 218 can each include any suitable processor, controller or digital signal processor that can provide sufficient processing power and reliability depending on the configuration, purposes and requirements of the autonomous mobile robot 210. In some embodiments, the vehicle processor 212 and the safety processor 218 can each include more than one processor with each processor being configured to perform different dedicated tasks.

The vehicle processor 212 may be operable to navigate the autonomous mobile robot 210 in response to one or more of: a navigation command and an operational signal. The autonomous mobile robot 210 may be an autonomous mobile robot 110. The navigation command may be a command to navigate the autonomous mobile robot 210 to a specified waypoint. The operational signal may, in some instances, be a command to stop or slow the autonomous mobile robot 210.

The vehicle processor 212 and the safety processor 218 can each operate the vehicle data storage 214, the communication component 216, the sensing system 220, and the drive system 230. For example, the vehicle processor 212 and the safety processor 218 can each operate the drive system 230 to navigate to the waypoints or destination location as identified by a fleet management system. The vehicle processor 212 and the safety processor 218 can each also operate the drive system 230 to avoid collisions with objects detected in the autonomous mobile robot's proximity and bring the autonomous mobile robot to a stop, or rest position. The operation of the vehicle processor 212 and the safety processor 218 can each be based on data collected from the robot data storage 214, the communication component 216, the sensing system 220, and/or the drive system 230, in some embodiments.

Given waypoints or a destination location, the vehicle processor 212 can determine a trajectory to the destination location. A trajectory can be defined as a time-parameterized path and a path can be defined based on a series of positions, which may or may not include headings. Different trajectories can relate to the same path as an autonomous mobile robot may follow the same path but at different speeds.

The vehicle data storage 214 can include RAM, ROM, one or more hard drives, one or more flash drives or some other suitable data storage elements such as disk drives, etc. For example, the robot data storage 214 can include volatile and non-volatile memory. Non-volatile memory can store computer programs consisting of computer-executable instructions, which can be loaded into the volatile memory for execution by the vehicle processor 212 or the safety processor 218. Operating the vehicle processor 212 to carry out a function can involve executing instructions (e.g., a software program) that can be stored in the vehicle data storage 214 and/or transmitting or receiving inputs and outputs via the communication component 216. The vehicle data storage 214 can also store data input to, or output from, the vehicle processor 212 or the safety processor 218, which can result from the course of executing the computer-executable instructions for example.

In some embodiments, the vehicle data storage 214 can store data related to the operation of the autonomous mobile robot 210, such as one or more electronic maps of its operating environment and/or operating parameters. The vehicle data storage 214 can store data tables, data processing algorithms (e.g., image processing algorithms), as well as other data and/or operating instructions which can be used by the vehicle processor 212 or the safety processor 218. The vehicle processor 212 and the safety processor 218 can each operate to process data received from the sensing system 220.

The communication component 216 can include any interface that enables the autonomous mobile robot 210 to communicate with other components, and external devices and systems. In some embodiments, the communication component 216 can include at least one of a serial port, a parallel port or a USB port. The communication component 216 may also include a wireless transmitter, receiver, or transceiver for communicating with a wireless communications network (e.g., using an IEEE 802.11 protocol or similar). The wireless communications network can include at least one of an Internet, Local Area Network (LAN), Ethernet, Firewire, modem or digital subscriber line connection. Various combinations of these elements may be incorporated within the communication component 216. For example, the communication component 216 may receive input from various input devices, such as a mouse, a keyboard, a touch screen, a thumbwheel, a track-pad, a track-ball, a card-reader, voice recognition software and the like depending on the requirements and implementation of the autonomous mobile robot 210. For example, the communication component 216 can receive commands and/or data from the computing device 120 and/or another autonomous mobile robot (e.g., another autonomous mobile robot operating within the operating environment).

The communication component 216 can receive information about obstacles and/or unexpected objects located in the autonomous mobile robot's operating environment directly from other autonomous mobile robots within the same operating environment and/or indirectly via a fleet management system. The vehicle processor 212 can update an electronic map stored in the vehicle data storage 214 with this information, for example. The vehicle processor 212 may also transmit, via the communication component 216 for example, information related to obstacles and/or unexpected objects identified in its operating environment to other autonomous mobile robots directly or indirectly via the fleet management system.

The sensing system 220 can monitor the environment of the autonomous mobile robot 210. The sensing system 220 can include one or more vehicle sensors for capturing information related to the environment. The information captured by the sensing system 220 can be applied for various purposes, such as localization, navigation, mapping and/or collision avoidance. For example, the sensing system 220 can include optical sensors equipped with depth perception capabilities, infrared (IR) capabilities, or sonar capabilities. The optical sensors can include imaging sensors (e.g., photographic and/or video cameras), and range-finding sensors (e.g., time of flight sensors, Light Detection and Ranging (LiDAR) devices which generate and detect reflections of pulsed laser from objects proximal to the autonomous mobile robot 210, etc.). The sensing system 220 can also include navigational sensors, such as ground positioning system (GPS) sensors, as well as sensors that detect guiding infrastructure installed within the operating environment. Example sensors that detect guiding infrastructure can include, but not limited to, magnetic sensors that detect magnetic tape within a facility warehouse, and/or optical sensors that detect visual navigational indicators within the operating environment. The sensing system 220 can include proximity sensors that detect people or objects within a proximity of the autonomous mobile robot 210.

The sensing system 220 may comprise at least one vehicle sensor operable to detect a triggering event and generate an operational signal in response to detecting the triggering event. The triggering event may be any event in which it is desirable for the autonomous mobile robot 210 to immediately react to. The operational signal may comprise any signal that is desirable for the sensing system 220 to generate in response to detecting the triggering event for the purposes of alerting other components. For example, the triggering event may comprise an event in which a proximity sensor detects a person or object within the proximity of the autonomous mobile robot 210. As another example, the trigger event may comprise an event in which an optical sensor, such as a LiDAR sensor, generates a detection such that there is a possibility of an obstacle being in proximity to the autonomous mobile robot 210. In response, an example operational signal may include a command to apply emergency braking. For example, a 'high' voltage or a '1' bit could be sent to an input terminal dedicated to monitoring safety braking events.

The sensing system 220 can also monitor the operation of the autonomous mobile robot 210. The sensing system 220 can include example sensors, such as encoders, arranged to measure the speed of a wheel of the autonomous mobile robot 210, the traction of the autonomous mobile robot 210, or the tilt angle of the autonomous mobile robot 210. In some embodiments, encoders are provided for each wheel. On tricycle autonomous mobile robots, encoders can measure the steering angle along with the drive velocity. The sensing system 220 can include sensors to measure the presence, the mass, or the type of a payload of the autonomous mobile robot 210.

The sensing system 220 can include a vehicle odometry system to monitor continuous variables and/or discrete variables. For example, continuous variables can relate to speed, velocity, traction, steering angle, tilt angle, and/or payload mass measurements while discrete variables can relate to the presence of a payload, the type of payload, and/or the presence of a human within a proximity of the autonomous mobile robot 210.

The sensing system 220 can include one or more components that control the operation of the sensors. For example, the components can include, but is not limited to, one or more processors, programmable logic controllers (PLCs), motor contactors, and/or relays. In some embodiments, the sensing processors can receive data collected by the sensors and process the collected data. The sensing processors can operate independently from the vehicle processor 212 and the safety processor 218. In some embodiments, the sensing system 220 can receive the data collected by the sensors and transmit the collected data to the vehicle processor 212 and the safety processor 218 for processing. In other embodiments, the sensing system 220 can directly incorporate functionality from the safety processor 218.

The drive system 230 can include the components required for steering and driving the autonomous mobile robot 210. For example, the drive system 230 can include the steering component and drive motor. Specifically, the drive system 230 may include a motor and/or brakes connected to drive wheels 232a and 232b for driving the autonomous mobile robot 210. The motor can be, but is not limited to, an electric motor, a combustion engine, or a combination/hybrid thereof. Depending on the application of the autonomous mobile robot 210, the drive system 230 may also include control interfaces that can be used for controlling the drive system 230. For example, the drive system 230 may be controlled to drive the drive wheel 232a at a different speed than the drive wheel 232b in order to turn the autonomous mobile robot 210. Different embodiments may use different numbers of drive wheels, such as two, three, four, etc.

A number of wheels 234 may be included. The autonomous mobile robot 210 includes wheels 234a, 234b, 234c, and 234d. The wheels 234 may be wheels that are capable of allowing the autonomous mobile robot 210 to turn, such as castors, omni-directional wheels, and mecanum wheels. In some embodiments, the autonomous mobile robot 210 can be equipped with special tires for rugged surfaces or particular floor surfaces unique to its environment.

The sensing system 220 in FIG. 2 includes example vehicle sensors 220a, 220b, and 220c. The sensors 220a, 220b, 220c can include, but are not limited to, optical sensors arranged to provide three-dimensional (e.g., binocular or RGB-D) imaging, two-dimensional laser scanners, and three-dimensional laser scanner.

The positions of the components 234, 220, 240, 230, 232 of the autonomous mobile robot 210 is shown for illustrative purposes and are not limited to the illustrated positions. Other configurations of the components 234, 220, 240, 230, 232 can be used depending on the application of the autonomous mobile robot 210 and/or the environment in which the autonomous mobile robot 210 will be used.

Figure 3:
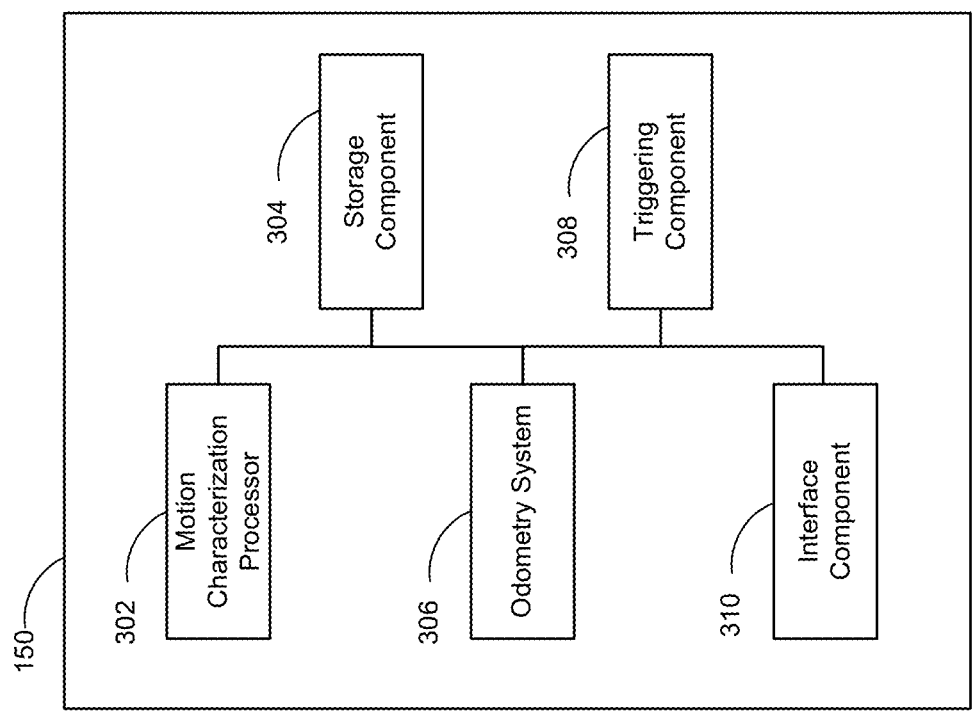
FIG. 3 is a block diagram of example components of an example motion characterization system.

Reference is next made to FIG. 3, which illustrates a schematic diagram of a motion characterization system 150 in accordance with an exemplary embodiment. The motion characterization system 150 comprises a motion characterization processor 302, a storage component 304, an odometry system 306, a triggering component 308, an interface component 310.

The motion characterization system 150 may be used with an autonomous mobile robot to capture the motion characteristics of the autonomous mobile robot in response to a triggering event. For example, the motion characterization system may be used in a system as shown in FIG. 1 to capture motion characteristics of the autonomous mobile robot 110 in response to a triggering event. In some embodiments, the motion characterization system 150 may be sold as a kit where it can be configured for and installed on a number of different autonomous mobile robots.

In some embodiments, the motion characterization system 150 can observe vehicle odometry to track vehicle trajectory. For example, motion characterization system 150 can include rotary encoders that directly contact the floor around the autonomous mobile robot, and/or cameras. The motion characterization system 150 can include a dedicated processing unit that is not joined to the processing of the subject autonomous mobile robot.

The motion characterization system 150 can, in some embodiments, produce a triggering event and track vehicle motion data from the moment the triggering event is initiated. For example, the motion characterization system 150 can transform collected odometry information into vehicle cartesian coordinates. In some embodiments, the motion characterization system 150 may be able to accept correction factors for system calibration. In some embodiments, the motion characterization system 150 may be able to produce outputs including, but not limited to, vehicle cartesian coordinates and corresponding yaw angle with origin set at the vehicle location at the time of the triggering event. In some embodiments, the motion characterization system 150 can capture vehicle motion data until the subject autonomous mobile robot comes to a complete stop.

Odometry system 306 may be operable to collect vehicle motion data associated with a motion of the subject autonomous mobile robot and transmit the data to the motion characterization processor 302. The odometry system 306 may be configured such that any vehicle body motion can be captured, including lateral translation, longitudinal translation, rotation, or any combination thereof. For example, the odometry system 306 may comprise an encoder connected directly to differentially mounted vehicle idler wheels. As another example, the odometry system 306 may include encoders mounted to the ground in a caster configuration, with yaw encoders tracking the yaw of a measuring wheel encoder connected to the casters.

In some embodiments, the odometry system may be operationally independent from the vehicle odometry system of the autonomous mobile robot (for example, the vehicle odometry sensing component of the sensing system 220 in an autonomous mobile robot 110). The odometry system may be configured to provide vehicle movement information independent of the subject autonomous mobile robot, such that at least the direction and velocity of the subject autonomous mobile robot can be continuously received by the motion characterization processor 302.

The triggering component 308 may be coupled with respect to a vehicle sensor (for example, the vehicle sensor component of the sensing system 220 of the autonomous mobile robot 110) and may be operable to cause a triggering event. The triggering event may be any event for which it is desirable for the subject autonomous mobile robot to produce a time-sensitive reaction. For example, the triggering event may be the sensing system 220 in an autonomous mobile robot 110 generating a LiDAR return that indicates a possibility that an obstacle may be in proximity of the vehicle. The triggering component 308 may receive a trigger signal to actuate a physical component of the triggering component, thereby causing the triggering event.

The triggering component 308 may be any device that is capable of causing the triggering event. The triggering component 308 may be configured such that the motion characterization processor 302 can actuate an object to drop into a safety field of the subject autonomous mobile robot. For example, if the triggering event is specifically a LiDAR return generated by the vehicle sensor indicating the presence of an obstacle in proximity of an autonomous mobile robot 110, the triggering component 308 can include any physical means of producing a LiDAR return indicating an obstacle in physical proximity of the autonomous mobile robot 110. This may include, but is not limited to, a rotating arm or solenoid physical moving into the path of one or more LiDAR beams generated by sensing system 220.

In some embodiments, the triggering component 308 may be capable of resetting itself to an initial position without human intervention. For example, the triggering component may be operable to receive a reset signal, and may be operable to actuate in response to reset itself to an initial state. For clarify, the reset signal could also comprise of the absence of a signal. For instance, a reset signal could be indicated by the absence of the initial trigger signal, which may have been held high for the duration of the period of the triggering event.

The storage component 304 may be configured to store an event start time, an event end time and vehicle motion data between the event start time and the event end time. The storage component 304 may comprise any readable and writeable storage device, such as an SD card, SSD, flash memory, and any other similar storage device. The motion characterization processor 302 may read or write data to the storage component 304. In some embodiments, other components or external devices may read to and write from the storage component 304. In some embodiments, the storage component 304 may comprise a config file or an output .csv file.

The interface component 310 may be configured to communicate with external systems. The interface component may send and receive data and commands to external systems, such as the computing device 120 as shown on FIG. 1, through physical media or wireless media.

Motion characterization processor 302 can, in some embodiments, receive an initialization input to initiate the triggering event. The initialization input may comprise any input that commands the motion characterization system 150 to initiate the triggering event. For example, the initialization input may be an input from a computing device 120 commanding the motion characterization system 150 to begin testing. The initialization input may be a one-time command sent to manually initiate a testing session, or a series of inputs sent as a part of an automated testing mode. The initialization input may be sent over the network 130.

Motion characterization processor 302 may be configured to generate a trigger signal to cause the triggering component 308 to cause the triggering event. The trigger signal may be any signal that causes the triggering component 308 to cause the triggering event. For example, the trigger signal may be a signal that causes the triggering component 308 to actuate, thereby impeding a LiDAR beam pulse given off by the sensing system 220. The triggering signal may, for example, be a 'high' signal that energizes a relay, which then energizes an actuating component contained within the triggering component 308.

The motion characterization processor 302 may identify an event start time as a time when the triggering signal is sent to the triggering component, and an event end time as a time when the subject autonomous mobile robot completes a response to the triggering event. The motion characterization processor 302 may optionally identify other important times associated with capturing data related to vehicle motion. The determination of the subject autonomous mobile robot completing a response to the triggering event may be user-defined. The motion characterization processor 302 may store this information in the storage component 308.

In some embodiments, the motion characterization processor 302 may monitor at least one motion parameter associated with the subject autonomous mobile robot, wherein the at least one motion parameter is within a tolerance range before the characterization processor sends the event signal. The motion characterization processor 302 may do this using data received from odometry system 306. The at least one motion parameter may comprise one or more of: a linear velocity of the vehicle, an angular velocity of the vehicle, a linear acceleration of the vehicle, and angular acceleration of the vehicle. The tolerance range may be a user-configurable range. The tolerance range may be set for the purposes of, for example, ensure that the vehicle is operating between a certain minimum and maximum velocity before a triggering event is activated so that conditions can be consistent across various trials. The tolerance range may also comprise a range that is substantially 0. For example, the motion characterization processor 302 may monitor the linear/angular acceleration of an autonomous mobile robot 110 and ensure that linear/angular acceleration is 0 before proceeding with activating the triggering event, as doing so may allow for greater consistency of data collection for traction-based trials.

In some embodiments, the vehicle completes the response to the triggering event when the motion characterization processor 302 determines that the vehicle is no longer in motion. For example, the motion characterization processor 302 may monitor a velocity of an autonomous mobile robot 110 for a time when the velocity of the autonomous mobile robot 110 goes to 0.

The motion characterization system 150 may preferably contain the capability to automatically reset to an initial state to conduct a further test without any manual intervention. In some embodiments, the motion characterization processor 302 may be operable to receive a reset input and cause the triggering event to reset upon receiving the reset input. The reset input may be a signal from an external device (for example, the computing device 120 in FIG. 1) instructing the system to reset to its initial state. The motion characterization processor 302 may cause the triggering event to reset by triggering a reset of the triggering component, thereby removing the obstruction sensed by the sensing system 220. In some embodiments, the reset input could be one in a series of reset inputs sent as a part of an automatic testing mode in which the system is operable to automatically reset itself to perform continuous automated testing.

In some embodiments, the motion characterization processor 302 may continuously record vehicle motion data from a predefined start time to a predefined end time. The start time and end time may be configured by a user. For example, the predefined start time may be before the motion characterization processor 302 begins monitoring the at least one motion parameter. As another example, the start time may be after the motion characterization processor 302 sends the triggering signal to the triggering component 308. The predefined end time may, for example, be after the motion characterization processor determines that the subject autonomous mobile robot has come to a stop. The motion characterization processor 302 may store the data on storage component 308.

In some embodiments, the motion characterization processor 302 may receive odometry information and apply forward kinematics equations to translate the odometry information into vehicle position data. The vehicle motion data may include the vehicle position data.

In some embodiments, the motion characterization processor may be configured to output trajectory data in an easily consumable data format.

Figure 4:
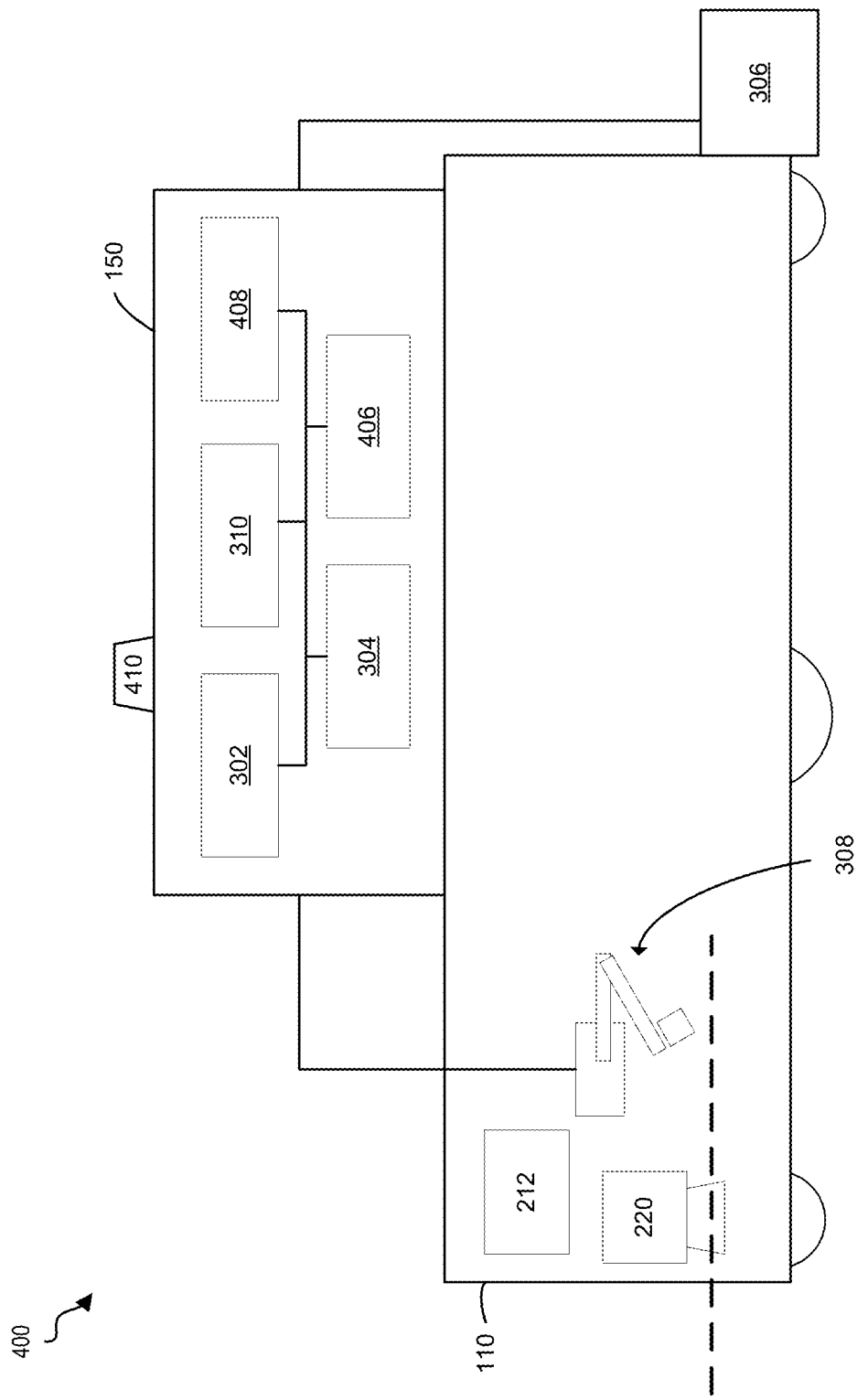
FIG. 4 is a block diagram of another example autonomous mobile robot coupled with an example motion characterization system.

Reference is next made to FIG. 4, which illustrates a schematic diagram of a system 400 for characterizing a vehicle motion of an autonomous mobile robot 110 in response to a triggering event using the motion characterization system 150. System 400 comprises the motion characterization system 150 and the autonomous mobile robot 110.

The autonomous mobile robot 110 may be the autonomous mobile robot 210 and may include at least the components of the autonomous mobile robot 210 as shown in FIG. 2, including a vehicle processor 212 and a sensing system 220. As described, the vehicle sensor is operable to detect the triggering event and generate an operational signal in response to detecting the triggering event. The vehicle processor is operable to navigate the autonomous mobile robot 110 in response to one or more of: a navigation command or the operational signal. The navigation command may be a command to use the drive system 230 to move the autonomous mobile robot 110 from one waypoint to another. The operational signal may be a signal to stop or slow the vehicle.

The motion characterization system 150 may be coupled to the autonomous mobile robot 110. As shown in FIG. 3, the motion characterization system 150 includes the motion characterization processor 302, the storage component 304, the odometry system 306, the triggering component 308, and the interface component 310. In some embodiments, the motion characterization system 150 may additionally include one or more of: a data acquisition unit 406, a battery 408, an indicator 410.

As described above, the odometry system 306 may be operable to collect vehicle motion data associated with the vehicle motion. The triggering component 308 may be coupled with respect to the vehicle sensor, and operable to cause the triggering event. The storage component 304 may store an event start time, an event end time, and the vehicle motion data between the event star time and the event end time. In some embodiments, the odometry system may be operationally independent from a vehicle odometry system of the autonomous mobile robot.

As described for FIG. 3, the motion characterization processor 302 may be operable to receive an initialization input to initiate the triggering event; generate a trigger signal to cause the triggering component 308 to cause the triggering event; and identify the event start time as a time when the triggering signal is sent to the triggering component 308, and an event end time as a time when the autonomous mobile robot 110 completes a response to the triggering event.

The system 400 may be configured such that a time delay can be calculated between when the triggering signal was generated by the motion characterization processor 302 and when the vehicle sensor 220 of the autonomous mobile robot 110 actually detected the triggering event. For example, this may entail knowing a time elapsed during the actuation of the triggering component as well as any processing delays in transmitting the triggering signal associated with hardware and software components in the system. The time delay can be incorporated into a calculation script to determine, to a higher level of precision than otherwise, a precise time when the triggering event was detected by vehicle sensors 220, and therefore, a precise time at which trajectory measurement or calculation should begin.

In some embodiments, the autonomous mobile robot 110 completes the response to the triggering event when the motion characterization processor 302 determines that the autonomous mobile robot 110 is no longer in motion.

In some embodiments, the motion characterization processor 302 may be further operable to: receive a reset input; and cause the triggering event to reset upon receiving the reset input.

In some embodiments, the motion characterization processor 302 may be further operable to monitor at least one motion parameter associated with the autonomous mobile robot 110 and wherein the at least one monitored motion parameter is within a tolerance range before the characterization processor sends the event signal.

In some embodiments, the motion characterization processor 302 is further operable to continuously record the vehicle motion data from a predefined start time to a predefined end time.

The data acquisition unit 406 may convert raw odometry input from the odometry system 306 into calculable data. For example, the calculable data may include pixel offsets or encoder ticks at a fixed frequency. The data acquisition unit may be a Labjack® unit or a device of similar capabilities.

The battery 408 may provide power to the processing unit. The battery 408 may also provide power to energy the triggering component. For example, the battery 408 may output 12 VDC to energize a solenoid contained in the triggering component through a relay switch. The battery 408 may comprise a portable battery pack. The battery 408 may contain a USB power output.

The indicator 410 may be a visual or auditory indicator that is configured to indicate when the motion characterization system 150 generates the trigger signal. For example, the indicator may be an LED light, a buzzer, or a combination thereof.

Figure 5:
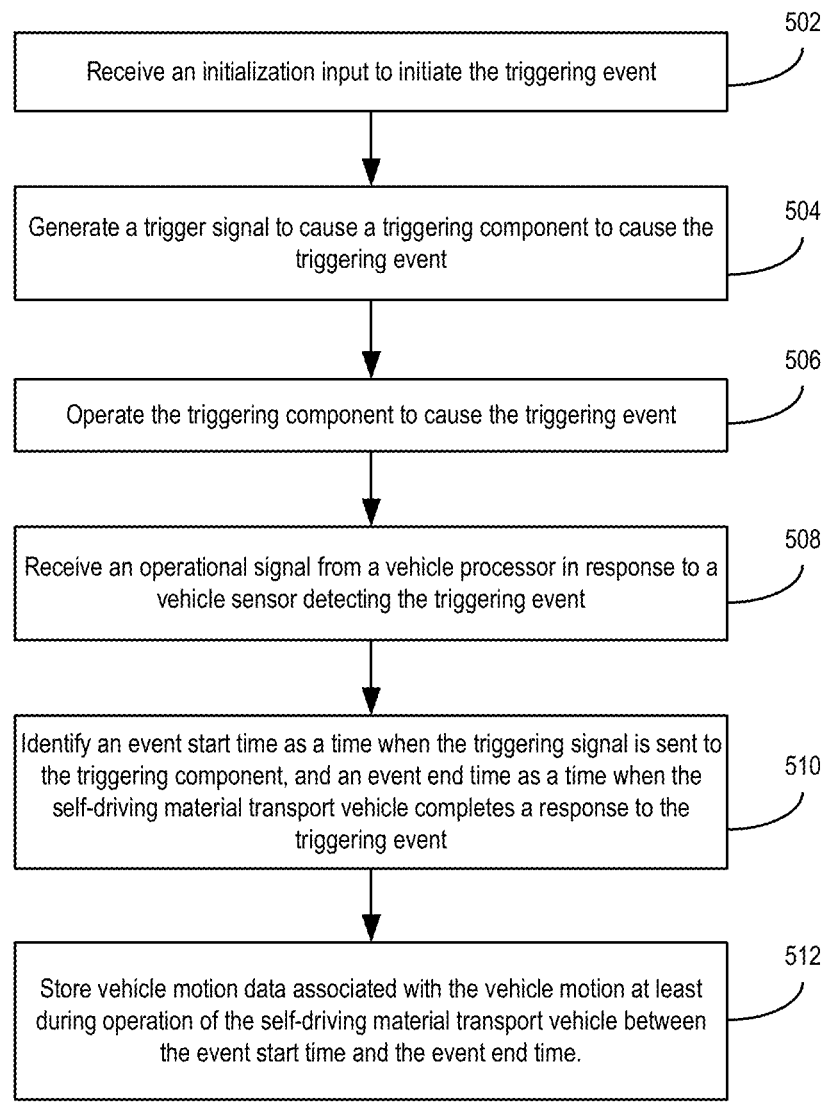
FIG. 5 is a flow diagram of an example method for characterizing a motion of an autonomous mobile robot in accordance with an example embodiment.

Reference is next made to FIG. 5, which shows a method 500 for characterizing a vehicle motion of an autonomous mobile robot 110 in response to a triggering event, the method carried out by operating a motion characterization system 150 coupled to the autonomous mobile robot 150.

At 502, the motion characterization system 150 may receive an initialization input to initiate the triggering event.

In some embodiments, the motion characterization system may be operable to further monitor at least one motion parameter associated with the vehicle and determining that the motion parameter is within a tolerance range before the causing the triggering event.

In some embodiments, the initialization input may be generated externally, for example by a computing device 120. In other embodiments, the motion characterization processor 302, in other words, the motion characterization system 150 itself, may generate the initialization input. The motion characterization system 150 may generate the initialization input upon determining that the motion parameter is within a tolerance range. For example, the motion characterization system 150 may generate an initialization input upon detecting that the autonomous mobile robot 110 reaching a certain speed.

At 504, the motion characterization system 150 is operable to generate a trigger signal to cause a triggering component to cause the triggering event.

At 506, the motion characterization system 150 is operable to operate the triggering component 308 to cause the triggering event.

In some embodiments, the motion characterization processor 302 may be operable to send an indication to an audio/visual indicator component at the time that the triggering signal is sent to the event trigger. The audio/visual indicator component may be the indicator 410 as shown in FIG. 4.

At 508, the motion characterization system 150 may receive an operational signal from a vehicle processor in response to a vehicle sensor detecting the triggering event.

At 510, the motion characterization system 150 is operable to identify an event start time as a time when the triggering signal is sent to the triggering component, and an event end time as a time when the autonomous mobile robot 110 completes a response to the triggering event.

In some embodiments, the motion characterization system 150 may be operable to determine that the vehicle is no longer in motion. In such instances, autonomous mobile robot 110 is determined to have completed a response to the triggering event at a time that the determination is made.

At 512, the motion characterization system 150 is operable to store vehicle motion data associated with the vehicle motion at least during operation of the autonomous mobile robot 110 between the event start time and the event end time.

In some embodiments, the motion characterization system 150 may be operable to record the vehicle motion data continuously from a predefined start time to a predefined end time.

In some embodiments, the motion characterization system 150 may be further operable to receive a reset input and cause the triggering event to reset upon receiving the reset input.

In some embodiments, the method for characterizing a vehicle motion may involve using a testing program that is activated by a user. The program may be a script stored on a PC in communication with the autonomous mobile robot 110 and the motion characterization system 150. The program may present a user interface to the user. Upon activation, the program may proceed with a device initialization and calibration sequence.

The program may provide a menu for the user to select between different modes. The different modes may comprise, among others, stop distance trials, traction trials, and calibration.

The user may enter calibration mode. In calibration mode, the program may output parameters comprising current correction factors and offsets being used. The program may then prompt the user to indicate whether the parameters are acceptable. If the parameters are not acceptable, the script may prompt the user to enter new parameters. The script may then prompt the user again about the acceptability of the new parameters. If the parameters are acceptable, the program reads the odometry data. Then, data used for calibration correction factor calculations are output. Calibration procedures for rotational and linear motion accuracy may be conducted to determine the relative accuracy of the system and correction factors may be input to tune the system to produce results with greater accuracy.

The user may perform stop distance trials using the program. The program may operate the motion characterization processor 302 to conduct the stop distance trials. The program may prompt the user for test parameters. The user may review the parameters and determine if they are acceptable. If not, the user may revise the parameters.

If the parameters are acceptable, the program proceeds to calculating tolerances. The motion characterization processor 302 may then begin monitoring a motion parameter. The motion parameter may comprise the linear/angular velocity of the autonomous mobile robot 110. Once the linear or angular velocity is within a tolerance band, the motion characterization processor 302 may initiate a triggering event. The triggering event may be a safety stop resulting from an obstruction to the vehicle sensor 220.

The motion characterization processor 302 may record vehicle motion data. The vehicle motion data may be odometry data obtained from odometry system 30. The motion characterization processor 302 may continually record odometry data until a condition is met. The condition may be the autonomous mobile robot 110 coming to a stop. This may entail the motion characterization processor determining that the measured velocity of the autonomous mobile robot 110 has reached zero. The motion characterization processor 302 may then end recording and may perform post-processing of the data. The motion characterization processor 302 may then save the data in the storage component 304. The user may then input new parameters to begin a new stop distance trial or return to the main menu.

The user may perform traction trials using the program. The program may operate the motion characterization processor 302 to conduct the traction trials. The program may prompt the user for test parameters. The user may review the parameters and determine if they are acceptable. If not, the user may revise the parameters.

If the parameters are acceptable, the program proceeds to calculating tolerances. The motion characterization processor 302 may record vehicle motion data. The vehicle motion data may be odometry data obtained from odometry system 30.

The motion characterization processor 302 may then begin monitoring one or more motion parameters. The one or more motion parameters may comprise the linear/angular velocity or the linear/angular acceleration of the autonomous mobile robot 110. Once the linear velocity, angular velocity, linear acceleration, and angular acceleration, if applicable, are within a tolerance band, the motion characterization processor 302 may initiate a triggering event. The triggering event may be a safety stop resulting from an obstruction to the vehicle sensor 220.

The motion characterization processor 302 may continually record odometry data until a condition is met. The condition may be the autonomous mobile robot 110 coming to a stop. This may entail the motion characterization processor determining that the measured velocity of the autonomous mobile robot 110 has reached zero. The motion characterization processor 302 may then end recording and may perform post-processing of the data. The motion characterization processor 302 may then save the data in the storage component 304. The user may then input new parameters to begin a new stop distance trial or return to the main menu.

Reference is next made to FIG. 6a-6d, which shows examples embodiments of autonomous mobile robot 110 equipped with a motion characterization system 150 to collect motion data in accordance with disclosed embodiments.

In FIG. 6a, shows an example stop distance trial involving the collection of data related to the stopping distance of the autonomous mobile robot 110 equipped with a motion characterization 150 in accordance with an embodiment. The autonomous mobile robot 110 may receive a navigation command through network 140, for example from computing device 120, to travel along a straight path at a linear velocity, as indicated by the straight arrow. The motion characterization system 150 can operate to monitor the linear velocity of the autonomous mobile robot 110. When the linear velocity of the autonomous mobile robot 110 comes within a tolerance band, the motion characterization system 150 may receive an initialization input to cause the triggering event. For example, the computing device 120 may send a command over network 140 to the motion characterization system 150 to initiate a safety stop. The motion characterization system 150 may operate the triggering component to cause the triggering event. For example, the triggering component may actuate a physical component to obstruct a LiDAR sensor of the autonomous mobile robot 110. The autonomous mobile robot 110 may come to a stop in response in accordance with stopping motion 612 shown in FIG. 6A. The motion characterization system 150 may collect vehicle motion data associated with the vehicle motion along the stopping motion 612. The motion characterization system 150 may identify relevant times for the processing of vehicle motion data, such as an event start time and an event end time. The motion characterization system may store odometry data throughout the stopping motion 612 in storage component 304 and associate the data with the measured linear and angular velocity.

In FIG. 6b, the autonomous mobile robot 110 may be commanded to travel along a straight path, but at a higher linear velocity than shown in FIG. 6A. The motion characterization system 150 may operate to monitor the linear and the angular velocity of the autonomous mobile robot 110 in FIG. 6b. Similar to FIG. 6a, the motion characterization system 150 may receive an initialization input and operate a triggering component to initiate a triggering event. To come to a stop from the higher linear velocity, the autonomous mobile robot 110 needs to follow a longer stopping motion 614 than the stopping motion 612 (as shown in FIG. 6B). Data associated with stopping motion 614 for the measured linear and angular velocities may be stored in the storage component 304. This data may be useful for determining a field shape of a vehicle for a scenario when the vehicle is travelling at higher velocities. Similar to the example shown in FIG. 6A, the motion characterization system may collect vehicle motion data associated with the vehicle motion along the stopping path 614 and identify relevant times.

Referring now to FIG. 6c, shown therein is a diagram 604 of another example motion 616 of the autonomous mobile robot 110 during a stop distance trial. In FIG. 6c, the autonomous mobile robot 110 is initiating a right turn, which involves operating the autonomous mobile robot 110 at an angular velocity (generally represented by the curved arrow) and a linear velocity (generally represented by the straight arrow). The motion characterization system 150 may operate to monitor the linear velocity and the angular velocity of the autonomous mobile robot 110 in FIG. 6c. The motion characterization system may initiate a triggering event, causing the autonomous mobile robot 110 to come to an emergency stop. The motion 616 illustrates a path in which the autonomous mobile robot 110 can take in order to stop during and/or after the turn. Data associated with stopping motion 616 for the measured linear and angular velocities may be stored in the storage component 304. This data may be useful for determining a field shape of a vehicle for a scenario when the vehicle is travelling along a first curved trajectory.

Referring now to FIG. 6d, shown therein is a diagram 606 of another example motion 618 of the autonomous mobile robot 110 when conducting a stopping distance trial. In FIG. 6d, as compared with FIG. 6c, the autonomous mobile robot 110 is conducting a sharper right turn, which involves a higher angular velocity than that of FIG. 6c (generally represented by the curvier arrow). The motion 618 illustrates a path in which the autonomous mobile robot 110 can take in order to stop during and/or after the turn. The motion characterization system 150 may operate to monitor the linear velocity and the angular velocity of the autonomous mobile robot 110 in FIG. 6d. The motion characterization system may initiate a triggering event, causing the autonomous mobile robot 110 to come to an emergency stop. Data associated with stopping motion 618 for the measured linear and angular velocities may be stored in the storage component 304. This data may be useful for determining a field shape of a vehicle for a scenario when the vehicle is travelling along a second curved trajectory.

In some embodiments, the autonomous mobile robot 110 shown in FIGS. 6a-6d may be conducting a traction trial. the motion characterization system may be able to collect data that captures the loss of traction during motions 612, 614, 616, 618. For example, the odometry system 306 may record a different odometry data than odometry captured by an internal odometry system of the autonomous mobile robot 110, indicating a loss of traction.

Reference is next made to FIGS. 7a-7c, which shows example sets of vehicle motion data that may be captured by the motion characterization system 150 during various trials in which the autonomous mobile robot 110 is stopping with some angular and linear velocity. In FIGS. 7a-7c, data is shown indicating the autonomous mobile robot's initial position 710 and final position 714 along its stopping path.

FIG. 7a shows outlines of the autonomous mobile robot 110 at positions 710a, 712a, 714a, representing different points along the stopping path of autonomous mobile robot when braking is initiated at while autonomous mobile robot 110 is travelling along a first trajectory. Safety buffers 720a, 722a, 724a for the autonomous mobile robot 110 at positions 710a, 712a, 714a, respectively are shown. An outline representing a field shape 730a for a given linear and angular velocity for the autonomous mobile robot 110 is shown.

FIG. 7b shows outlines of the autonomous mobile robot 110 at positions 710b, 712b, 714b, representing different points along the stopping path of autonomous mobile robot when braking is initiated at while autonomous mobile robot 110 is travelling along a second trajectory. Safety buffers 720b, 722b, 724b for the autonomous mobile robot 110 at positions 710b, 712b, 714b, respectively are shown. An outline representing a field shape 730b for a given linear and angular velocity for the autonomous mobile robot 110 is shown.

FIG. 7c shows outlines of the autonomous mobile robot 110 at positions 710c, 712c, 714c, representing different points along the stopping path of autonomous mobile robot when braking is initiated at while autonomous mobile robot 110 is travelling along a third trajectory. Safety buffers 720c, 722c, 724c for the autonomous mobile robot 110 at positions 710c, 712c, 714c, respectively are shown. An outline representing a field shape 730c for a given linear and angular velocity for the autonomous mobile robot 110 is shown.

As discussed above, the collected vehicle motion data may be used for determining field shapes and field sets for a particular vehicle geometry. A system for generating field sets may take in, as inputs, one or more field bucket definitions, the vehicle motion data, vehicle geometry data, safety buffer information, and vehicle sensor information.

The field bucket definitions may define sets of velocities over which different field sets and field shapes may be categorized. For example, the field bucket definitions may define different field shapes for a linear velocity between 0-3 m/s and a linear velocity between 3-5 m/s.

The vehicle motion data may comprise trajectory data, odometry data, velocities and acceleration data, timing data, and various other data related to the motion of a vehicle collected by a motion characterization system 150.

The vehicle geometry data may comprise information about a base vehicle geometry of an autonomous mobile robot 110, plus adjustments for load overhands and extensions.

The safety buffer information may comprise data related to stopping actuation delay, scanner measurement error, shin-toe allowance, safety-factor, brake-wear allowance, oversize, factors, buffer resolution and other factors relevant to safety factor determination. The safety buffer information may be unique to each autonomous mobile robot 110.

The vehicle sensor information may comprise information about vehicle sensor locations such as locations of LiDAR sensors on a given autonomous mobile robot 110. The vehicle sensor information may additionally comprise transformation inputs to transform LiDAR data into vehicle safety fields.

The system may produce, as outputs, field shapes, field sets, or validation reports. The system will use the vehicle motion data, vehicle geometry data, and safety buffer information to generate worst-case vehicle reach data. The system may optimize the bounding of said data into distinct field shapes. The system may validate the data against the original dataset. Physical test validation may be performed on the resulting fields using the vehicle for which motion and geometry data is provided. In some embodiments, the system may over-size and validate field shapes that where a resolution of the field shape is lowered for consumption by LiDAR software. The system may be implemented on a computing device. In some embodiments, the system may contain a user interface to enable modification of a first vehicle geometry data belonging to a first vehicle, thereby creating a second vehicle geometry data, and perform custom field set validation on the second vehicle geometry data using vehicle motion data belonging to the first vehicle.

A method of generating a field set using the system may begin with creating a vehicle outline using a vehicle geometry data. Then, the vehicle outline may be combined with field bucket definitions and safety buffer information to one or more generate buffer shapes. The vehicle motion data may be combined with the one or more buffer shapes to generate one or more polygons. Each of the one or more polygons may be stretched to incorporate an ending stop location, which may be contained within the vehicle motion data. A field set file may be generated from the one or more polygons. The field set file may be validated in software using the vehicle motion data. If the software validation is unsuccessful, the system may increase a buffer resolution factor, regenerate buffer shapes, and repeat the process from the buffer shape stage. If the software validation is successful, the method may proceed with physical validation on an autonomous mobile robot 110 for which the data corresponds to. If the physical testing is unsuccessful, the system may increase an oversize factor, regenerate buffer shapes, and repeat the process from the buffer shape stage. If the physical testing is successful, the field set is generated and produced as an output.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to above as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A system for characterizing a vehicle motion of an autonomous mobile robot in response to a triggering event, the system comprising:
   the autonomous mobile robot comprising:
   a vehicle sensor operable to detect the triggering event and generate an operational signal in response to detecting the triggering event; and
   a vehicle processor operable to navigate the autonomous mobile robot in response to one or more of: a navigation command and the operational signal; and
   a motion characterization system coupled to the autonomous mobile robot, the motion characterization system comprising:
   an odometry system operable to collect vehicle motion data associated with the vehicle motion;
   a triggering component coupled with respect to the vehicle sensor, and operable to cause the triggering event;
   a storage component for storing an event start time, an event end time and the vehicle motion data between the event start time and the event end time; and
   a motion characterization processor operable to:
   receive an initialization input to initiate the triggering event;
   generate a trigger signal to cause the triggering component to cause the triggering event; and
   identify the event start time as a time when the triggering signal is sent to the triggering component, and the event end time as a time when the autonomous mobile robot completes a response to the triggering event.

2. The system of claim 1, wherein the motion characterization processor is further operable to: receive a reset input; and cause the triggering event to reset upon receiving the reset input.

3. The system of claim 1, wherein the motion characterization processor is further operable to monitor at least one motion parameter associated with the autonomous mobile robot and wherein the at least one monitored motion parameter is within a tolerance range before the characterization processor generates the triggering signal.

4. The system of claim 3, wherein the motion characterization processor is further operable to determine that the autonomous mobile robot is no longer in motion and in response to determining that the autonomous mobile robot is no longer in motion, determine that the autonomous mobile robot completed the response to the triggering event.

5. The system of claim 4, wherein the motion characterization processor is further operable to continuously record the vehicle motion data from a predefined start time to a predefined end time.

6. The system of claim 1, wherein the odometry system is operationally independent from a vehicle odometry system of the autonomous mobile robot.

7. A method for characterizing a vehicle motion of an autonomous mobile robot in response to a triggering event, the method comprising operating a motion characterization system coupled to the autonomous mobile robot to:
   receive an initialization input to initiate the triggering event;
   generate a trigger signal to cause a triggering component to cause the triggering event;
   operate the triggering component to cause the triggering event;
   receive an operational signal from a vehicle processor in response to a vehicle sensor detecting the triggering event;
   identify an event start time as a time when the triggering signal is sent to the triggering component, and an event end time as a time when the autonomous mobile robot completes a response to the triggering event; and
   store vehicle motion data associated with the vehicle motion at least during operation of the autonomous mobile robot between the event start time and the event end time.

8. The method of claim 7, further comprising operating the motion characterization system to receive a reset input and cause the triggering event to reset upon receiving the reset input.

9. The method of claim 7, further comprising operating the motion characterization system to:
   monitor at least one motion parameter associated with the vehicle and determine that the motion parameter is within a tolerance range before causing the triggering event.

10. The method of claim 9, further comprising operating the motion characterization system to:
    determine that the vehicle is no longer in motion; and
    in response to determining that the vehicle is no longer in motion, determining that the vehicle completed a response to the triggering event.

11. The method of claim 10, further comprising operating the motion characterization system to:
    record the vehicle motion data continuously from a predefined start time to a predefined end time.

12. The method of claim 7, further comprising operating the motion characterization system to send an indication to an external component at the time that the triggering signal is generated.

13. A motion characterization system for an autonomous mobile robot, the motion characterization system comprising:
    an odometry system operable to collect vehicle motion data associated with a motion of the autonomous mobile robot;
    a triggering component coupled with respect to a vehicle sensor of the autonomous mobile robot, and operable to cause a triggering event;
    a storage component for storing an event start time, an event end time and vehicle motion data between the event start time and the event end time; and
    a motion characterization processor operable to:
    receive an initialization input to initiate the triggering event;

generate a triggering signal to cause the triggering component to cause the triggering event; and identify the event start time as a time when the triggering signal is sent to the triggering component, and the event end time as a time when the autonomous mobile robot completes a response to the triggering event.

14. The system of claim 13, wherein the motion characterization processor is further operable to: receive a reset input; and cause the triggering event to reset upon receiving the reset input.

15. The system of claim 13, wherein the motion characterization processor is further operable to monitor at least one motion parameter associated with the autonomous mobile robot, and wherein the at least one motion parameter is within a tolerance range before the motion characterization processor generates the triggering signal.

16. The system of claim 15, wherein the motion characterization processor is further operable to determine that the autonomous mobile robot is no longer in motion and in response to determining that the autonomous mobile robot is no longer in motion, determine that the autonomous mobile robot completed the response to the triggering event.

17. The system of claim 16, wherein the motion characterization processor is further operable to continuously record the vehicle motion data from a predefined start time to a predefined end time.

18. The system of claim 13, wherein the odometry system is operationally independent from vehicle odometry system of the autonomous mobile robot.

* * * * *